United States Patent [19]

Ley et al.

[11] Patent Number: 4,780,889
[45] Date of Patent: Oct. 25, 1988

[54] DEVICE FOR RELOCKING ONE OR A NUMBER OF IDENTICAL OR SUBMULTIPLE BINARY DATA SIGNAL TRAINS ON A SYNCHRONOUS REFERENCE CLOCK SIGNAL

[75] Inventors: Bruno Ley, Plounerin; Jean-Yves Jaouen, Loguivy-Les-Lannion, both of France

[73] Assignee: Alcatel Cit, Paris, France

[21] Appl. No.: 97,136

[22] Filed: Sep. 16, 1987

[30] Foreign Application Priority Data

Sep. 17, 1986 [FR] France ................. 86 13019

[51] Int. Cl.⁴ .................................. H04L 7/00
[52] U.S. Cl. ............................ 375/106; 375/3; 375/119
[58] Field of Search .......... 375/99, 101, 119, 120, 375/106, 3; 328/162, 165; 370/84; 307/262

[56] References Cited

U.S. PATENT DOCUMENTS

| 4,163,209 | 7/1979 | McRae | 375/101 |
|---|---|---|---|
| 4,317,212 | 2/1982 | Van Goerwen et al. | 375/113 |
| 4,376,309 | 3/1983 | Fenderson et al. | 375/101 |
| 4,415,984 | 11/1983 | Gryger et al. | 364/900 |
| 4,416,017 | 11/1983 | Jasper et al. | 375/99 |
| 4,420,696 | 12/1983 | Gemma et al. | 307/262 |
| 4,464,769 | 8/1974 | Forsberg et al. | 375/110 |
| 4,694,468 | 9/1987 | Cullum | 375/101 |
| 4,700,357 | 10/1987 | Ast | 375/4 |

OTHER PUBLICATIONS

Patent Abstracts of Japan, vol. 5, No. 125 (E-69) [797], Aug. 12, 1981; & JP-A-56 61 851 (Nippon Denshin Denwa Kosha) May 27, 1981.
Patent Abstracts of Japan, vol. 5, No. 149 (E-75) [821], Sep. 19, 1981; & JP-A-56 80 944 (Fujitsu K.K.) Jul. 2, 1981.
IBM Technical Disclosure Bulletin, vol. 26, No. 3B, Aug. 1983, pp. 1535-1536, New York, USA; J. C. Froment et al.: "Four-phase signal generator using a balanced input/output driver", p. 1535, lines 3-8.

*Primary Examiner*—Robert L. Griffin
*Assistant Examiner*—Stephen Chin
*Attorney, Agent, or Firm*—Sughrue, Mion, Zinn, Macpeak & Seas

[57] ABSTRACT

The relocking device comprises a polyphase clock signal generator for producing n clock signals which are equally displaced in phase with respect to each other including the reference clock signal, and rephasing circuits each assigned to one data train to be relocked and each having the function of selecting that version of the clock signal which is most effectively locked with respect to the data train to be processed by means of a double-sampling circuit and a clock-signal selecting circuit addressed by a sequential scanning circuit controlled by a comparator. The rephasing circuits utilize said version for sampling precise values of the data contained in the data train concerned and regenerate said data train by resampling these values in synchronism with the reference clock signal.

4 Claims, 3 Drawing Sheets

DEVICE FOR RELOCKING ONE OR A NUMBER OF IDENTICAL OR SUBMULTIPLE BINARY DATA SIGNAL TRAINS ON A SYNCHRONOUS REFERENCE CLOCK SIGNAL

BACKGROUND OF THE INVENTION

1. Field of the Invention

The present invention relates to processing of digital signal trains formed by a sequence of binary data which occupy equal time intervals and more particularly to relocking of one or a number of binary signal trains having identical or submultiple data flow rates on a synchronous local clock signal so as to permit recovery by sampling of the exact values of the data contained in the digital signal train or trains. This operation, which is necessary for good reception of a binary data signal train, must also be performed in data-processing devices for receiving binary data at identical flow rates via different channels from separate sources having no known phase relationship.

2 Description of the Prior Art

Two categories of devices are already known for relocking a data signal train with respect to a synchronous clock signal. The devices of the first category such as those described in French patent Application No. FR-A-2,567,696 produce a set of versions of the binary data train with different time-delays uniformly distributed over the duration of a clock signal period, sample the entire set of versions by means of the clock signal and select the version having the best framing with respect to the clock signal as being the version in which sampling produces the same results as those of the other two more and less delayed versions which are located nearer to it on each side and possibly also of other more and less delayed versions which are located at a greater distance on each side. The devices of the second category such as those described in French patent Application No. FR-A-2,567,697 produce a reference version of the data train located between two other versions which are more and less delayed with respect to the clock signal. The three versions remain within a time-delay range which extends over one period of the clock signal and displace all three versions relatively to the clock signal in such a manner as to ensure that sampling of the three versions by the clock signal produces the same results. This relative displacement preferably takes place by imposing an adjustable time-delay on the data train from which the three delayed versions are derived, thus permitting optimum framing of the reference version with respect to the clock signal.

These two categories of relocking devices utilize a minimum of three versions of each data signal train to be relocked, these three versions being differently delayed with respect to each other, thus contributing to the complexity of these devices which rapidly increases with the number of data trains to be processed.

SUMMARY OF THE INVENTION

The present invention relates to a device for relocking one or a number of data signal trains hereinafter designated as data trains. This device differs from those mentioned earlier in a more simple structure which permits operation at higher binary data flow rates.

The device under consideration has the function of relocking one or a number of binary data trains having identical or submultiple flow rates on a local clock signal Ho having a frequency Fo which is synchronous with the data train having a higher flow rate Do. Said device comprises a polyphase clock signal generator for producing n synchronous clock signals which are also displaced in phase with respect to each other including the reference clock signal. The device further comprises rephasing circuits, namely one rephasing circuit per data train to be relocked, the function of each circuit being to select the clock signal version which is the most effectively locked with respect to the data train to be processed by said circuits, to utilize said version for sampling precise values of the data contained in the data train concerned and to regenerate the data train concerned by resampling these values in synchronism with the reference clock signal. Each rephasing circuit comprises:

a circuit for selecting one of the clock signals of the polyphase clock signal generator which is addressed by a sequential scanning circuit, a double sampling circuit for performing two successive sampling operations on the data train concerned which is to be relocked on a time interval of less than one quarter of a clock signal period, one of the sampling operations being synchronized with the clock signal delivered by the selecting circuit, a comparator for comparing the values of each double sampling operation which produces a progression of the sequential scanning circuit in the event of a discrepancy in the values, a data-train regeneration circuit which performs relocking of the data train concerned by resampling, in synchronism with the reference clock signal, of one of the samples delivered by the double sampling circuit.

In the event that the double sampling circuit has a not-negligible response time with respect to the unitary time-delay which exists between the clock signals delivered by the polyphase clock-signal generator, it is preferable to have a regenerating circuit which proceeds in two stages, namely in a first stage at the recurrence rate either of the reference clock signal or of the complemented version of this latter, the choice being directed to the version which has the smallest lead with respect to the clock signal delivered by the selecting circuit and, in a second stage, at the recurrence rate of the reference clock signal.

The binary data signal trains having flow rates which are submultiples Do/k with k a whole number can be considered as data trains at the flow rate Do in which each binary element is repeated k times. In consequence, relockng of the data transitions on the leading edges of the local clock signal Ho takes place in exactly the same manner in the case of binary data trains having flow rates Do or in the case of submultiples Do/k.

DESCRIPTION OF THE PREFERRED EMBODIMENTS

Figure 1:
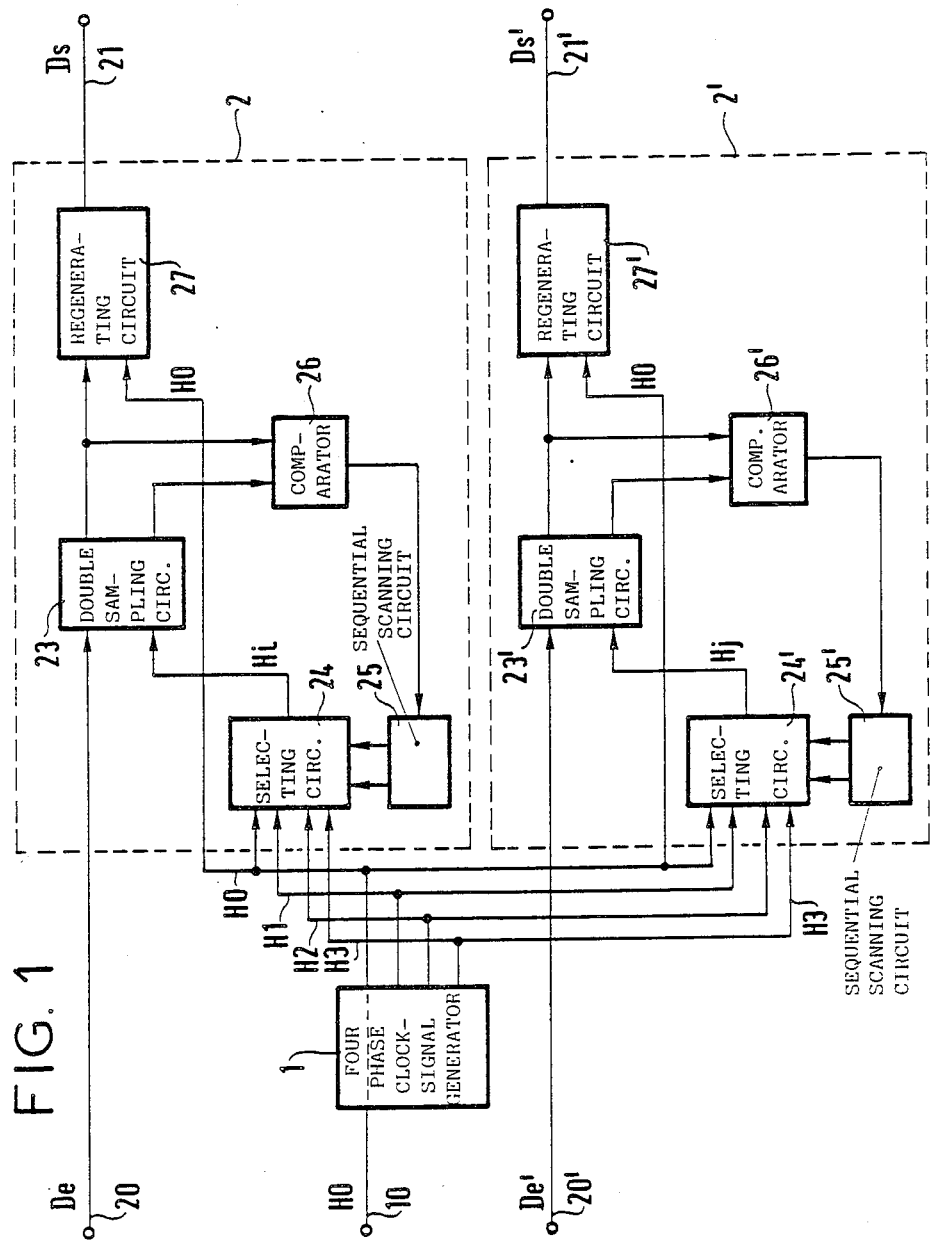
FIG. 1 is a block diagram of a device in accordance with the invention for relocking two binary data trains having the same flow rates on a synchronous local clock signal.

The device shown diagrammatically in FIG. 1 permits relocking of two binary data (signal) trains having the same data flow rates without any known phase relationship on the leading edges of a reference clock signal HO which is synchronous with the two data trains.

The reference clock signal HO delivered by a local clock is applied via an input 10 to a four-phase clock signal generator 1 which delivers in addition to the reference clock signal HO three other versions H1, H2, H3 of the clock signal which are delayed by one, two and three quarters of a period with respect to the reference clock signal HO.

The two binary data trains De and De' to be relocked are applied via two separate inputs 20 and 20' to individual rephasing circuits 2 and 2' having identical structures which also receive the four clock signals HO, H1, H2 and H3 delivered by the four-phase clock-signal generator 1 and which deliver on two separate outputs 21 and 21' the binary data trains Ds and Ds' which are relocked with respect to the leading edge of the reference clock signal HO.

Each rephasing circuit 2, 2' comprises on the one hand a double-sampling circuit 23, 23' which, in combination with a four-phase clock-signal selecting circuit 24, 24' addressed by a sequential scanning circuit 25, 25' controlled by a comparator 26, 26', makes it possible to select the clock signal Hi, Hj which is the most effectively locked with respect to the incoming binary data signal train De, De' and, by means of this latter, to extract the precise values of data contained in the incoming train De, De' and, on the other hand, a regenerating circuit 27, 27' for reconstituting from the precise values of the data delivered by the double-sampling circuit 23, 23' a version Ds, Ds' of the incoming binary-data train De, De' which is relocked on the leading edges of the reference clock signal HO and delivered at the output 21, 21' of the relocking device.

Figure 2:
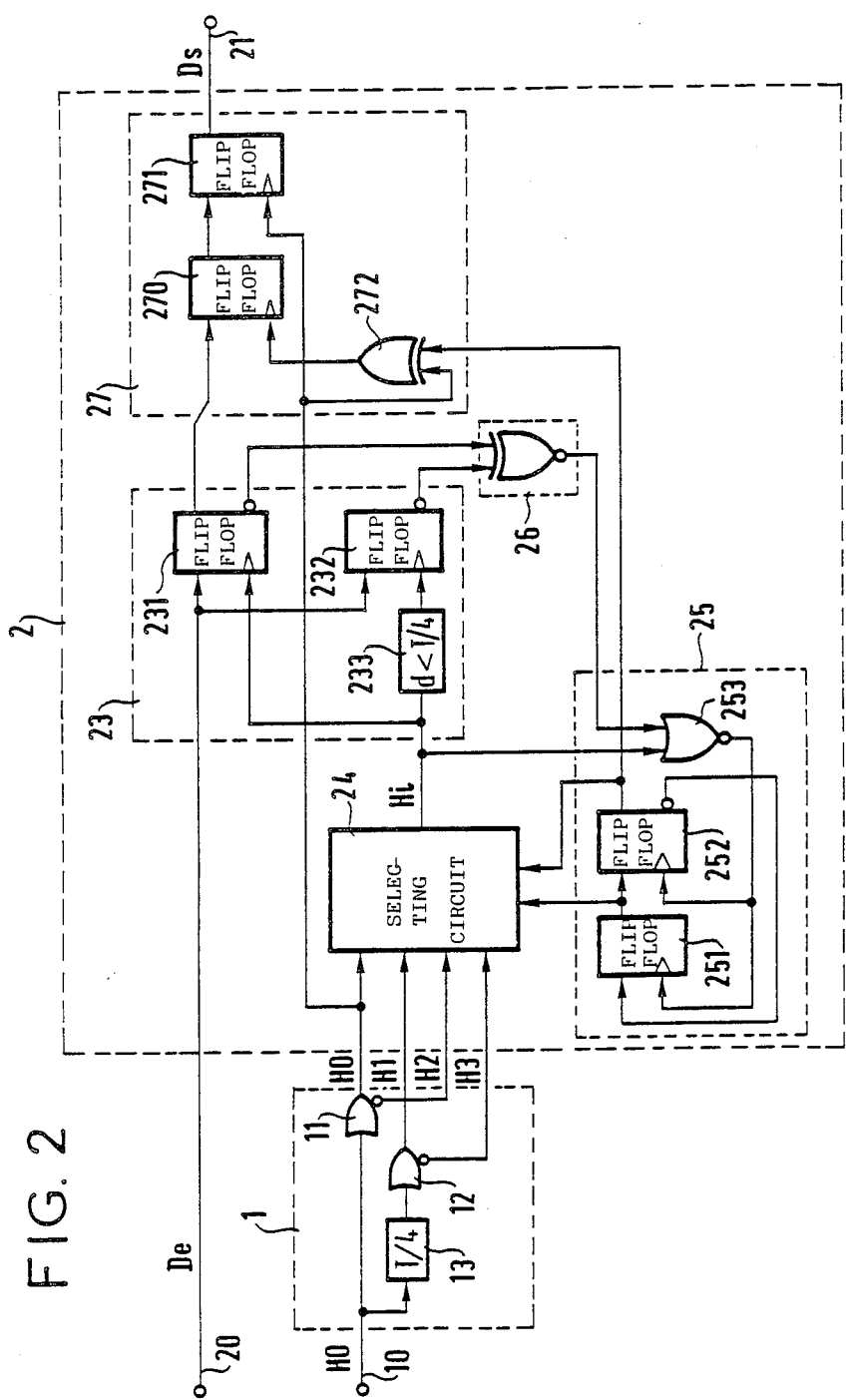
FIG. 2 is a detail diagram of a polyphase clock signal generator and of one of the rephasing circuits shown in FIG. 1.

FIG. 2 is a detail diagram showing the four-phase clock signal generator 1 and one of the rephasing circuits designated by the reference numeral 2.

The four-phase clock signal generator 1 is composed of two gates 11 and 12 having single inputs, inverting and non-inverting outputs, the inputs of said gates being connected to the input 10 of the relocking device, directly in the case of the gate 11 and via a delay circuit 13 in the case of the gate 12 so as to introduce a time-delay equal to one quarter-period of the clock signal. The gate 11 which is directly connected to the input 10 on which is applied the reference clock signal HO restitutes this signal on its non-inverting output and a complemented signal on its inverting output which constitutes a clock signal H2 delayed by one half-period with respect to the reference clock signal HO. The gate 12 connected to the input 10 via the delay circuit 13 which introduces a time-delay of one quarter-period of the clock signal delivers on its non-inverting output a clock signal H1 delayed by one quarter-period with respect to the reference clock signal HO and delivers on its inverting output a clock signal H3 delayed by three-quarters of a period with respect to the reference clock signal HO.

It is worthy of note at this juncture that the property of symmetry possessed by the clock signal makes it possible in contrast to the binary data signal trains to obtain phase-shifted versions of the clock signal by means of a simple inversion operation. It is thus possible to obtain an even number n of clock signals equally displaced in phase with respect to each other over the duration of a clock period $T = 1/Fo \; n/2 - 1$ delay circuits for all channels whereas, if the binary data signal trains were phase-shifted instead of the clock signal, it would be necessary to provide $(n-1)$ delay circuits for each data signal train. The penalty attached to this method is that the relocking operation takes place with respect to a clock signal Hi which is not necessarily the reference clock signal H0.

The four clock signals H0, H1, H2, H3 are applied in the rephasing circuit 2 to the inputs of the selecting circuit 24 which delivers one of said signals Hi on its output and in which addressing is controlled by the sequential scanning circuit 25. As long as it is not blocked, this circuit 25 causes the four clock signals HO, H1, H2, H3 to succeed each other cyclically and in the same order at the output of the selecting circuit 24. Said sequential scanning circuit is constituted by a two-stage counter formed by two D-type flip-flops 251, 252 which are triggered on leading edges, connected as feedback loops and repetition-rate-controlled by the complemented version of the clock signal Hi delivered by a two-input NOR-type logic gate 253, one input of which is connected to the output of the selecting circuit 24 whilst the other input serves as a blocking control and is active at the logic level 1 during the half-periods in which the clock signal Hi is at the logic level O.

The incoming binary data train De is applied in the rephasing circuit 2 to the double-sampling circuit 23 formed by two D-type flip-flops 231, 232 which are triggered on leading edges, which receive the incoming binary data train De on their data input D and which are repetition-rate-controlled by the clock signal Hi delivered by the selecting circuit 24, that is, delivered directly in the case of the flip-flop 231 and delivered in the case of the flip-flop 232 via delay circuit 233 which imparts to the clock signal Hi a time-delay d of higher value than the sum of the times of holding and prepositioning of the flip-flops 231, 232 and of lower value than one-quarter of the period T of the clock signal.

The complemented outputs of the two flip-flops 231 and 232 of the double-sampling circuit 23 are applied to the inputs of the comparator 26 constituted by an EXCLUSIVE-NOR logic gate which controls the blocking input of the sequential scanning circuit 25.

The output state of the EXCLUSIVE-NOR logic gate of the comparator 26 has no effect on the sequential scanning circuit 25 while the two samples are being obtained by the double-sampling circuit 23 since this operation of taking two samples takes place during the half-periods in which the clock signal Hi is at the logic level 1 and imposes a logic level O at the output of the logic gate 253 of the sequential scanning circuit 25. After taking of the two samples and during the end of the half-period in which the clock signal Hi is at the logic level 1 and the following half-period in which the clock signal Hi undergoes a transition to the logic level O, the output of the EXCLUSIVE-NOR logic gate of the comparator 26 changes either to the logic level O if the two samples are different from each other while allowing the trailing edge of the clock signal Hi to pass through the logic gate 253 and permitting progression of the sequential scanning circuit 25 which changes the selected clock signal Hi, or to the logic level 1 if the two samples are identical, thus blocking the logic gate 253 of the sequential scanning circuit 25 and maintaining the previously selected version of the clock signal Hi.

Figure 3:
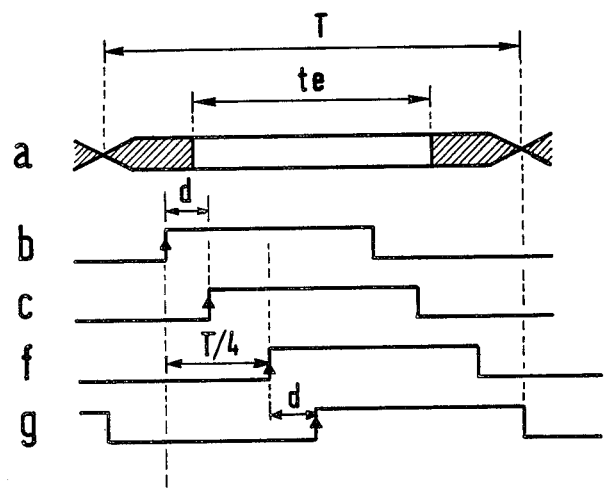
FIGS. 3 and 4 are diagrams of curves which serve to explain the operation of a double-sampling circuit shown in FIG. 2 and forming part of each rephasing circuit.

The fact that sampling of the incoming binary data train De by the clock signal Hi and the version of said signal delayed by d produce the same results shows that its leading edges define sampling instants located outside jitter zones, thus making it possible to detect the precise values of data contained in the jittered incoming train De of binary data signals. The diagrams of FIG. 3 illustrate this property as well as the process of adjustment of double-sampling instants.

There is shown at a a unitary time interval T of the incoming binary data train De on each side of which is located a jitter zone having the effect of reducng the useful time-duration or width of aperture of the eye diagram to a fraction te of the unitary time interval T. There is shown at b a clock signal Hi, the leading edge of which is incorrectly locked and located within the jitter zone at the beginning of the unitary time interval. There is shown at c the version of said clock signal Hi to which a time-delay d has been assigned.

In dependence on the jitter, there rapidly appears a difference between the values of a double sampling which produces a progression of the sequential scanning circuit 25 and has the effect of replacing the clock signal version H0, H1, H2 or H3 adopted for the clock signal Hi by the version H1, H2, H3 or H0 which exhibits an additional time-delay of T/4 and which is represented at f with its version to which is assigned the time-delay d as shown at g. The leading edge of this new clock signal Hi and of its version having the assigned delay d come within the valid portion of the data which result in double samplings which have the same values, which block the sequential scanning circuit 25 and which maintain the clock signal version H0, H1, H2 or H3 adopted for the clock signal Hi.

Figure 4:
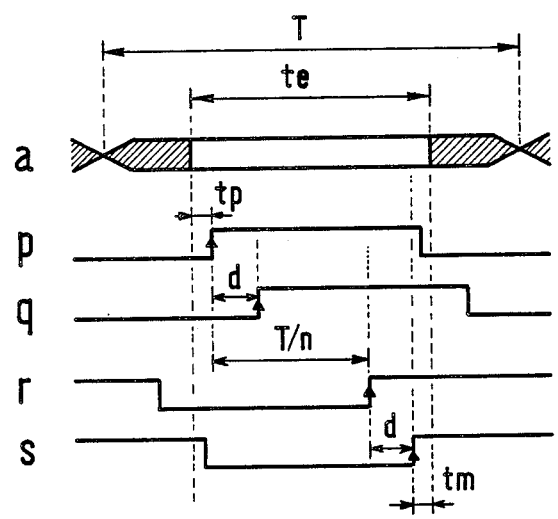

In order to ensure that the leading edges of the new clock signal Hi and of its version having an assigned time-delay d as represented at f and g come effectively within the valid portion of the data, there appears a condition on the maximum peak-to-peak jitter of the incoming data train De which is deduced from the extreme case illustrated in the diagrams of FIG. 4 in respect of a relocking device having a polyphase clock signal generator which delivers n clock signals delayed by T/n with respect to each other.

There can be distinguished in the diagrams of FIG. 4:

at a, a unitary time interval T of the incoming binary data train De with a jitter zone located at each end and limiting the useful time-duration te of a datum to a fraction of the unitary time interval T, at p, the clock signal having leading edges which appear as close as possible to the beginning of the useful time-duration of a datum while maintaining correct double sampling which results in identical values, said leading edges being separated from the beginning of the useful time-duration of a datum by a time interval tp corresponding to the time of prepositioning of the flip-flop 231, at q, the version delayed by a time interval d of the clock signal represented at p, at r, a clock signal delayed by T/n with respect to the clock signal shown at p and assumed to have leading edges which appear as close as possible to the end of the useful time-duration of a datum while producing correct double sampling which results in identical values, at s, the version delayed by a time interval d of the clock signal represented at r having leading edges which again appear within the useful time-duration of a datum, a time interval tm prior to the end of said time-duration being such as to correspond to the holding time of the flip-flop 232.

In order to ensure with unerring accuracy that the leading edge of one of the clock signals delivered by the polyphase signal generator is correctly placed within the useful time-duration te of a datum, this latter must satisfy the inequality:

$$te \geq tp + T/n + d + tm$$

whence a permissible peak-to-peak jitter Gcc in the case of the incoming binary data train De:

$$Gcc = T - te$$

$$Gcc = \frac{n-1}{n} T - (d + tp + tm)$$

To revert to the example developed earlier with reference to a relocking device provided with a four-phase clock-signal generator constructed with an ECL 100 K fast prediffused-network technology resulting in prepositioning times tp of 0.31 ns and a holding time tm of 0.2 ns, there is obtained within the scope of utilization with 140 Mbit/s data trains and a double-sampling delay time of 0.55 ns, a maximum permissible peak-to-peak jitter value of $$Gcc = \frac{3}{4} \frac{10^{-6}}{140} - (0.55 + 0.31 + 0.2)10^{-9} = 4.3 \ ns$$

which corresponds to a minimum aperture of the eye diagram of 40 %.

When the selected clock signal Hi has leading edges which are correctly positioned within the useful time-duration of the data of the incoming train De, there is obtained at the output of the flip-flops 231, 232 of the double-sampling circuit 23 a new and practically jitter-less version of the incoming binary data train which is in phase (subject to the time of propagation through the flip-flop 231) with the selected clock signal Hi or in other words with one of the clock signals H0, H1, H2, H3 of the four-phase clock-signal generator 1 which is identifiable by the addressing value of the selecting circuit 24.

This new version of the incoming binary data train which is practically free from jitter and available at the output of the flip-flop 231 of the double-sampling circuit 23 has to be rephased with the reference clock signal H0 by the regenerating circuit 27. This circuit proceeds in two steps in order to provide as long a period of time as possible for propagation of the signal through the flip-flop 231 and in order to increase as far as possible the operating speed capability of the relocking device. Said regenerating circuit essentially comprises two D-type flip-flops 270, 271 placed in sequence.

The first D-type flip-flop 270 performs a first rephasing operation on the new version of the binary data train delivered by the flip-flop 231 either with respect to the reference clock signal H0 if the selected clock signal Hi is the reference clock signal H0 or the clock signal H1 or with respect to the clock signal H2 if the selected clock signal Hi is the clock signal H2 or the clock signal H3. To this end, said flip-flop receives on its D input the non-complemented output signal of the flip-flop 231 of the double-sampling circuit and on its clock input the reference clock signal H0 or its complemented version H2 which are delivered thereto by means of an EXCLUSIVE-OR logic gate 272 having two inputs connected in one case to the output of the four-phase clock signal generator 1 for delivering the reference clock signal H0 and in the other case to the noncomplemented output of the second flip-flop 252 of the sequential scanning circuit 25 which, when it is at the logic level 0, limits the choice of the selecting circuit 24 to the clock signals H0, H1 and, when it is at the logic level 1, limits the choice of the selecting circuit 24 to the clock signals H2, H3.

In the presence of a selected clock signal Hi corresponding to the reference clock signal H0 or to the clock signal H2, the first flip-flop 270 of the regenerating circuit 27 operates in synchronism with the flip-flop 231 of the double-sampling circuit which therefore has the duration of a clock-signal period in order to change state. In the presence of a selected signal Hi corresponding to the clock signal H1 or to the clock signal H3, the first flip-flop 270 of the regenerating circuit 27 operates with a lead of one-quarter of a clock signal period on the flip-flop 231 of the double-sampling circuit 23 which therefore has three-quarters of a clock signal period in order to change state.

The second D-type flip-flop 271 performs final rephasing operation on the reference clock signal H0 of the version of the binary data train delivered by the first D-type flip-flop 270 in phase either with the reference clock signal H0 or with the reference clock signal H2. To this end, said flip-flop 271 receives on its D input the non-complemented output of the first D-type flip-flop 270 and on its clock input the reference clock signal H0 which is available at one of the outputs of the four-phase clock-signal generator 1.

The second D-type flip-flop 271 operates either in synchronism with the first D-type flip-flop or with a lead of one half-period of a clock signal. In all cases, this leaves the first flip-flop 270 at least one half-period of the clock signal in order to change state.

It would be possible to dispense with the first D-type flip-flop 270 but the flip-flop 231 of the double-sampling circuit would have in some cases only one-quarter of a clock signal period in order to change state. This may prove inadequate in the event of a high binary data rate since one quarter of a clock signal period of a 140-Mbit/s binary train has a time-duration of the order of 1.8 ns.

It would be possible to modify certain arrangements or to replace certain means by equivalent means without thereby departing from the scope of the invention.

What is claimed is:

1. A device for relocking one or a number of binary data trains having identical or submultiple flow rates on a reference synchronous clock signal, comprising a polyphase clock signal generator for producing synchronous clock signals which are also displaced in phase with respect to each other and one rephasing circuit per incoming binary data train, each rephasing circuit being constituted by:

a circuit for selecting one of the clock signals delivered by the polyphase clock signal generator, a circuit for sequential scanning of addressing of the selecting circuit which has the effect at the time of progression of exchanging the clock signal selected from those delivered by the polyphase clock-signal generator for another clock signal which is displaced in phase by a predetermined value, a double-sampling circuit for carrying out two successive sampling operations on the train of data to be relocked over a predetermined time interval d, one sampling operation being performed at the repetition rate of the clock signal delivered by the selecting circuit, a comparator for comparing the values of each double sampling operation which produces a progression of the sequential scanning circuit in the event of a discrepancy in the values, wherein said clock signal generator comprises means for producing n signals delayed by $T/n$ with respect to each other including the reference clock signal, where T is the period of the synchronous clock signal and n is a whole number greater than 1, wherein the scanning circuit initiates exchange of the selected clock signal for another signal displaced in phase by $T/n$, wherein the change in clock signal selection is carreid out by the scanning circuit in the case of all periods and even consecutive periods in which the two samples are different, wherein the sampling operation is performed over a time interval d which is shorter than the elementary phase shift $T/n$, and wherein said device further comprises a regenerating circuit including means for carrying out relocking of the data train concerned by the resampling operation in synchronism with the reference clock signal H0 of one of the samples delivered by the double-sampling circuit.

2. A device according to claim 1, wherein the double-sampling circuit comprises a delay circuit for delaying by a time interval d the clock signal delivered by the selecting circuit and two flip-flops which sample the incoming data train to be relocked, in synchronism in one case with the clock signal delivered by the selecting circuit and in the other case with the delayed version of said clock signal delivered by said delay circuit.

3. A device according to claim 1, wherein the regenerating circuit comprises a first flip-flop for sampling one of the samples of the data train to be relocked as delivered by the double-sampling circuit, the double-sampling operation being performed in synchronism either with the reference clock signal or with the complemented version of the reference clock signal, the choice being directed to the signal which has the smallest lead with respect to the clock signal delivered by the selecting circuit, and a second flip-flop for sampling the output signal of the first flip-flop in synchronism with the reference clock signal.

4. A relocking device according to claim 1, wherein the polyphase clock signal generator produces an even number n of clock signals displaced in phase by $T/n$ with respect to each other including the reference clock signal by means of $n/2-1$ delay circuits and $n/2$ complementation circuits.

* * * * *